United States Patent
Challa et al.

(10) Patent No.: US 7,298,776 B2
(45) Date of Patent: Nov. 20, 2007

(54) ACQUISITION OF A GATED PILOT SIGNAL WITH COHERENT AND NONCOHERENT INTEGRATION

(75) Inventors: Raghu Challa, San Diego, CA (US); Rao Yallapragada, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 729 days.

(21) Appl. No.: 10/112,216

(22) Filed: Mar. 28, 2002

(65) Prior Publication Data
US 2003/0112856 A1 Jun. 19, 2003

Related U.S. Application Data

(60) Provisional application No. 60/340,644, filed on Dec. 14, 2001.

(51) Int. Cl.
*H04B 1/00* (2006.01)
(52) U.S. Cl. ............ 375/148; 375/130; 375/134; 375/137; 375/142; 375/150; 370/500
(58) Field of Classification Search ............ 375/148, 375/130, 134, 137, 142, 150
See application file for complete search history.

(56) References Cited

U.S. PATENT DOCUMENTS

| | | | | |
|---|---|---|---|---|
| 5,644,591 A | * | 7/1997 | Sutton | 375/142 |
| 5,799,010 A | * | 8/1998 | Lomp et al. | 370/335 |
| 5,818,866 A | * | 10/1998 | Wilk | 375/149 |
| 5,898,665 A | * | 4/1999 | Sawahashi et al. | 370/342 |
| 6,067,315 A | * | 5/2000 | Sandin | 370/252 |
| 6,782,271 B2 | * | 8/2004 | Huh et al. | 455/522 |

FOREIGN PATENT DOCUMENTS

EP 1001551 A2 * 5/2000

* cited by examiner

*Primary Examiner*—Temesghen Ghebretinsae
*Assistant Examiner*—Juan Alberto Torres
(74) *Attorney, Agent, or Firm*—Kent D. Baker; Jonathan T. Velasco; Thomas R. Rouse (57) ABSTRACT

Systems and techniques are disclosed wherein a gated pilot signal can be acquired by producing a plurality of product values for each of a first and second signal and a generated signal, coherently combining portions of the product values produced from the first signal and noncoherently combining those coherently combined portions to produce a first value, coherently combining portions of the product values produced from the second signal and noncoherently combining those coherently combined portions to produce a second value, and noncoherently combining the first and second values.

54 Claims, 5 Drawing Sheets

ACQUISITION OF A GATED PILOT SIGNAL WITH COHERENT AND NONCOHERENT INTEGRATION

CROSS REFERENCE

This application claims priority from U.S. Provisional Application No. 60/340,644, filed Dec. 14, 2001 entitled "Acquisition of a Gated Pilot Signal with Coherent and Noncoherent Integration."

BACKGROUND

1. Field

The present invention relates generally to communications systems, and more specifically, to systems and techniques for acquisition of a gated pilot signal.

2. Background

In wireless communications system, a user may access a network, or communicate with other users, through one or more base stations. Typically, each base station is configured to serve all users in a specific geographic region generally referred to as a cell. In some high traffic applications, the cell may be divided into sectors with a base station serving each sector. Each base station transmits a pilot signal which allows a user to synchronize with a base station and provide coherent demodulation of the transmitted signal once the user is synchronized to the base station. The user generally establishes a communications channel with the base station having the strongest pilot signal.

The pilot signal is generally a known sequence embedded in the signal transmitted by the base station. By way of example, in code division multiple-access (CDMA) systems, the pilot signal can be characterized as an unmodulated signal spread with a known code. A user, or subscriber station, employs a locally generated replica of the spreading code to demodulate the pilot signal. The synchronization of the locally generated spreading code with the spread spectrum pilot signal is usually accomplished through an acquisition and tracking process. The acquisition process entails a search through an unknown region of time and frequency in order to bring the spread spectrum pilot signal into coarse alignment with the locally generated spreading code. Once the pilot signal has been acquired, a tracking loop can be used to optimize and maintain synchronization.

The ability of the subscriber station to acquire the pilot signal can be affected by numerous sources. By way of example, pilot signal acquisition can be severely hampered in the presence of residual frequency offsets in the baseband pilot signal due to local oscillator drift at the subscriber station. The difficulty in acquiring the pilot signal due to frequency offsets is a problem that is not unique to CDMA, but one that is common to all communications systems.

SUMMARY

In one aspect of the present invention, a method of correlation includes receiving first and second signals separated in time, producing a plurality of product values from each of the first and second signals and a generated signal, coherently combining portions of the product values produced from the first signal and noncoherently combining those coherently combined portions to produce a first value, coherently combining portions of the product values produced from the second signal and noncoherently combining those coherently combined portions to produce a second value, and noncoherently combining the first and second values.

In another aspect of the present invention, a correlator includes a buffer configured to receive first and second signals separated in time, a multiplier configured with the buffer to produce a plurality of product values from each of the first and second signals and a generated signal, a first adder configured with the multiplier to coherently combine portions of the product values produced from the first signal and coherently combine portions of the product values produced from the second signal, a second adder configured to noncoherently combine the coherently combined portions of the product values produced from the first signal to produce a first value and to noncoherently combine the coherently combined portions of the product values produced from the second signal to produce a second value, and a third adder configured to noncoherently combine the first and second values.

In yet another aspect of the present invention, a correlator includes means for receiving first and second signals separated in time, means for producing a plurality of product values from each of the first and second signals and a generated signal, means for coherently combining portions of the product values produced from the first signal and coherently combining portions of the product values produced from the second signal, means for noncoherently combining the coherently combined portions of the product values from the first signal to produce a first value and noncoherently combining the coherently combined portions of the product values from the second signal to produce a second value, and means for noncoherently combining the first and second values.

In a further aspect of the present invention, computer-readable media embodying a program of instructions executable by a computer program perform a method of correlation including receiving first and second signals separated in time, producing a plurality of product values from each of the first and second signals and a generated signal, coherently combining portions of the product values produced from the first signal and noncoherently combining those coherently combined portions to produce a first value, coherently combining portions of the product values produced from the second signal and noncoherently combining those coherently combined portions to produce a second value, and noncoherently combining the first and second values.

In yet a further aspect of the present invention, a method of acquiring a pilot signal includes transmitting first and second pilot signals separated in time from a remote source, receiving the first and second signals, producing a plurality of product values from each of the pilot signals and a generated signal, coherently combining portions of the product values produced from the first pilot signal and noncoherently combining those coherently combined portions to produce a first value, coherently combining portions of the product values produced from the second pilot signal and noncoherently combining those coherently combined portions to produce a second value, and noncoherently combining the first and second values.

In another aspect of the present invention, a communications system includes a transmitter configured to transmit first and second pilot signals separated in time, and a receiver configured to receive the pilot signals, the receiver comprising, a multiplier configured to produce a plurality of product values from each of the first and second pilot signals and a generated signal, a first adder configured with the multiplier to coherently combine portions of the product values produced from the first signal and coherently combine portions of the product values produced from the second signal, a second adder configured to noncoherently combine the coherently combined portions of the product values produced from the first signal to produce a first value and to noncoherently combine the coherently combined portions of the product values produced from the second signal to produce a second value, and a third adder configured to noncoherently combine the first and second values.

It is understood that other embodiments of the present invention will become readily apparent to those skilled in the art from the following detailed description, wherein it is shown and described only exemplary embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings wherein.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well known structures and devices are shown in block diagram form in order to avoid obscuring the concepts of the present invention.

In an exemplary embodiment of a communications system, a searching methodology may be employed to improve the visibility of a pilot signal in the presence of residual frequency offsets in the baseband pilot signal. This can be achieved with a correlation process that utilizes both coherent and noncoherent integration. In various embodiments, the coherent and noncoherent contribution to the integration process can be varied to optimize pilot signal acquisition across a spectrum of frequency offsets. This approach can be utilized in any communications system utilizing a continuous or gated pilot signal.

An exemplary embodiment of the searching process for pilot signal acquisition can be illustrated with reference to a CDMA communications system. The CDMA communications system is a modulation and multiple access scheme based on spread-spectrum communications. In a CDMA communications system, a large number of signals share the same frequency spectrum and, as a result, provide an increase in user capacity. This is achieved by transmitting each signal with a different pseudo-random noise (PN) code that modulates a carrier, and thereby, spreads the spectrum of the signal waveform. The transmitted signals are separated in the receiver by a correlator that uses a corresponding PN code to despread the desired signals spectrum. The undesired signals, whose PN codes do not match, are not despread in bandwidth and contribute only to noise.

Although various aspects of the present invention will be described in the context of a CDMA communications system, those skilled in the art will appreciate that the techniques for acquiring a pilot signal are likewise suitable for use in various other communications environments. Accordingly, any reference to a CDMA communications system is intended only to illustrate the inventive aspects of the present invention, with the understanding that such inventive aspects have a wide range of applications.

Figure 1:
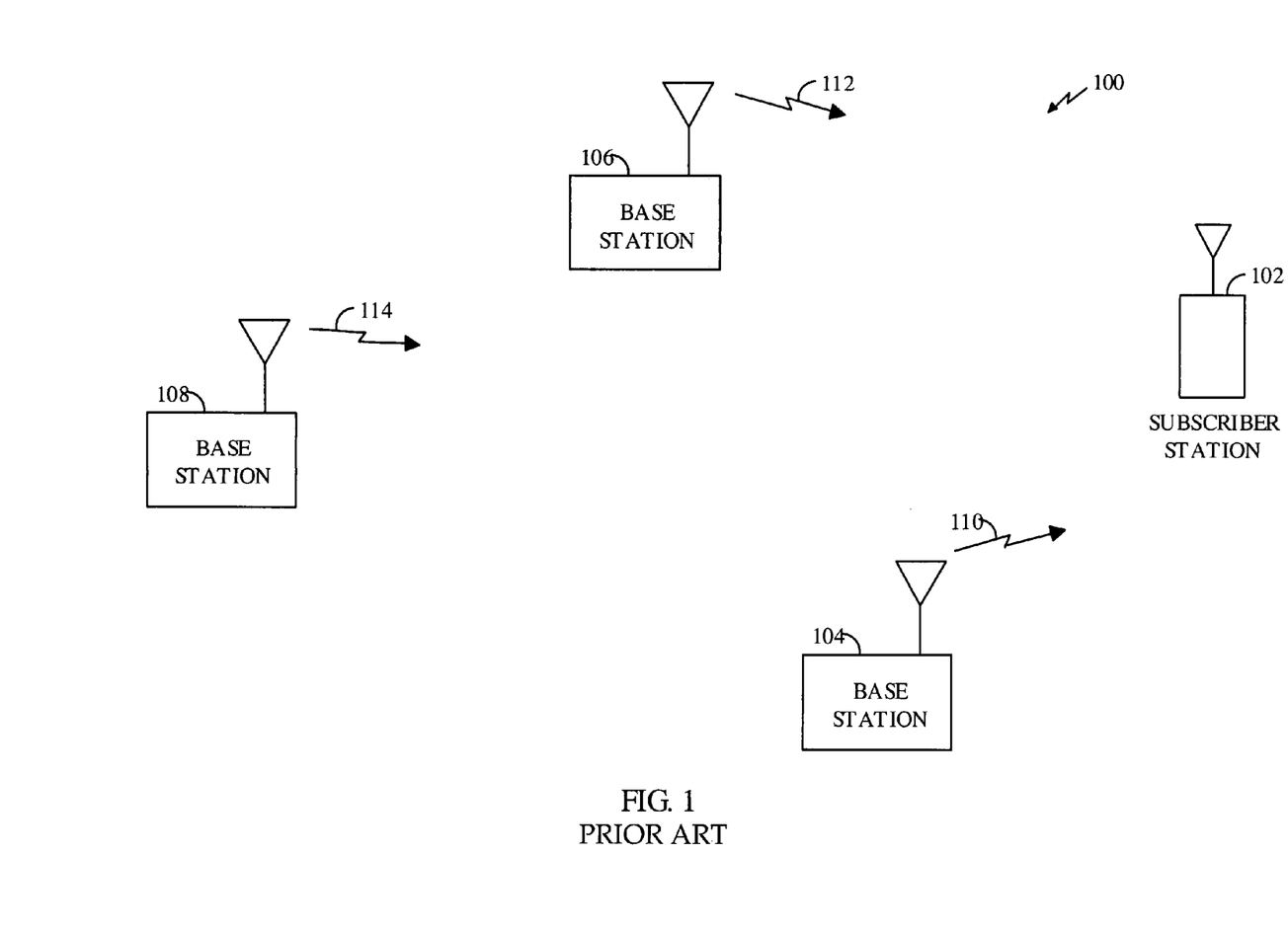
FIG. 1 is a system diagram of an exemplary communications system.

FIG. 1 is a system diagram of an exemplary communications systems 100. The communications system provides a mechanism for a subscriber station 102 to access a network, or communicate with other subscriber stations, through one or more base stations. For ease of explanation, only three base stations 104, 106 and 108 are shown, however, as a matter of practice, numerous base stations will be operating with at least one base station located in every cell. Should the cells be divided into sectors, a base station would be located in each sector. Each base station 104, 106 and 108 transmits a pilot signal 110, 112 and 114, respectively, over a forward link. The forward link refers to transmissions from a base station to a subscriber station. The subscriber station 102 attempts to synchronize to the CDMA communications system using one or more of the pilot signals during initial acquisition.

The pilot signals transmitted from the base stations 104, 106, and 108 can be distinguished from one another by using different PN codes. A reduction in acquisition time may be achieved by using the same PN code to spread each pilot signal, but with different phase offsets. This approach provides sufficient channelization between the base stations because time shifted versions of the same PN code have very little correlation with one another. At the same time, the subscriber station need only search through a single PN code for all phase offsets.

The PN code used to spread the pilot signals may take on various forms depending on the system application, the operating environment, and the overall design constraints. For purposes of illustration, a periodic PN code which is 32,768 chips long with 512 phase offsets spaced apart by 64 chips will be used to describe the inventive pilot acquisition techniques. An exemplary CDMA communications systems employing this methodology is a High Data Rate (HDR) communications system. The HDR communications system is typically designed to conform to one or more standards such as the "cdma2000 High Rate Packet Data Air Interface Specification,"3GPP2 C.S0024, Version 2, Oct. 27, 2000, promulgated by a consortium called "$3^{rd}$ Generation Partnership Project." The contents of the aforementioned standard is incorporated by reference herein. In communications systems other than HDR, the length of the PN code for spreading the pilot signal, the number of phase offsets, and the spacings between the phase offsets can be varied to optimize system parameters without departing from the inventive concepts described throughout.

Figure 2:
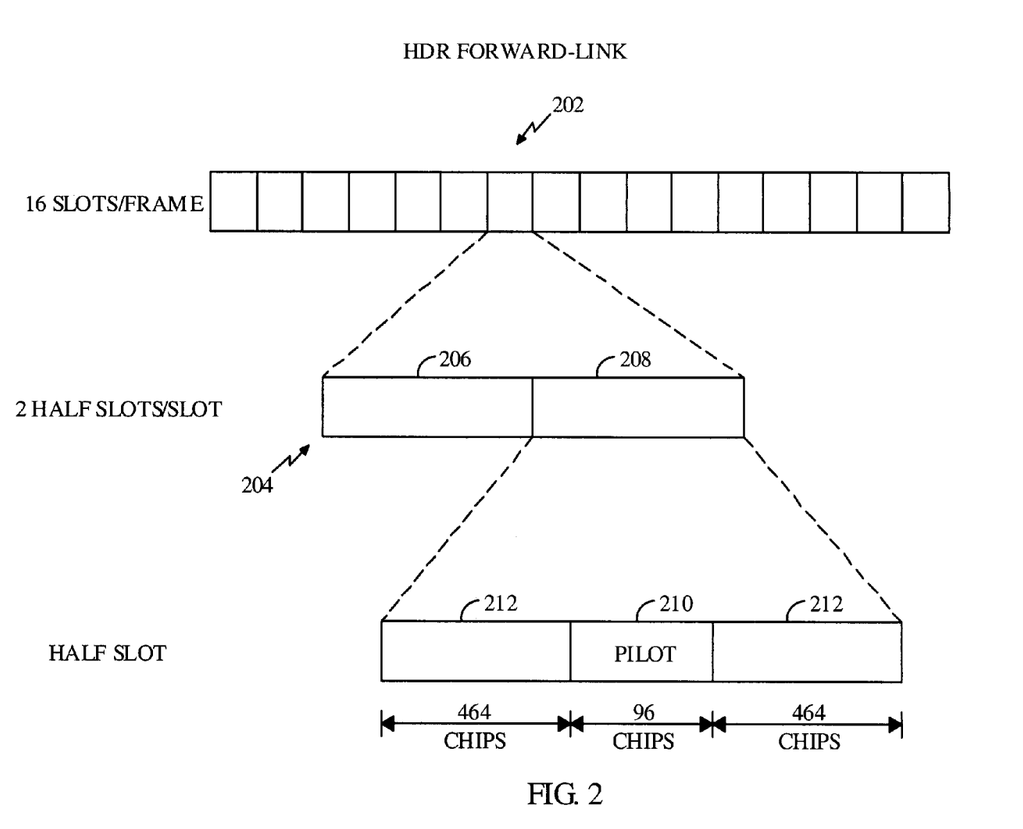
FIG. 2 is an exemplary forward link waveform for an HDR communications system.

The HDR communications system employs a gated pilot signal. An exemplary forward link waveform for an HDR communications system is shown in FIG. 2. The period of the PN code used to spread the pilot signal, i.e., 32,768 chips, can be defined as one frame 202. The frame is divided into 16 time slots each being 2048 chips long. Each time slot 204 is further divided into two half-slots 206, 208 with a gated pilot signal 210 centered within each half-slot. In the described exemplary embodiment, the gated pilot signal is chosen to be 96 chips in length. The gated pilot signal is generated from an unmodulated signal which is spread with the PN code and time-division multiplexed into the center of each half-slot. Various traffic and control channels can be time-division multiplexed into the remainder of each half-slot 212.

In the described exemplary HDR communications system, the frames transmitted by each base station are time aligned. As a result, the gating function applied to the pilot signal for each base station will occur simultaneously resulting in 512 unique spread spectrum gated pilot signals due to the different phase offsets. The frame alignment can be achieved by synchronizing the base stations to one another in any manner known in the art. By way of example, the base stations could be synchronized to a common time reference such as the Navstar Global Positioning satellite navigation system.

Figure 3:
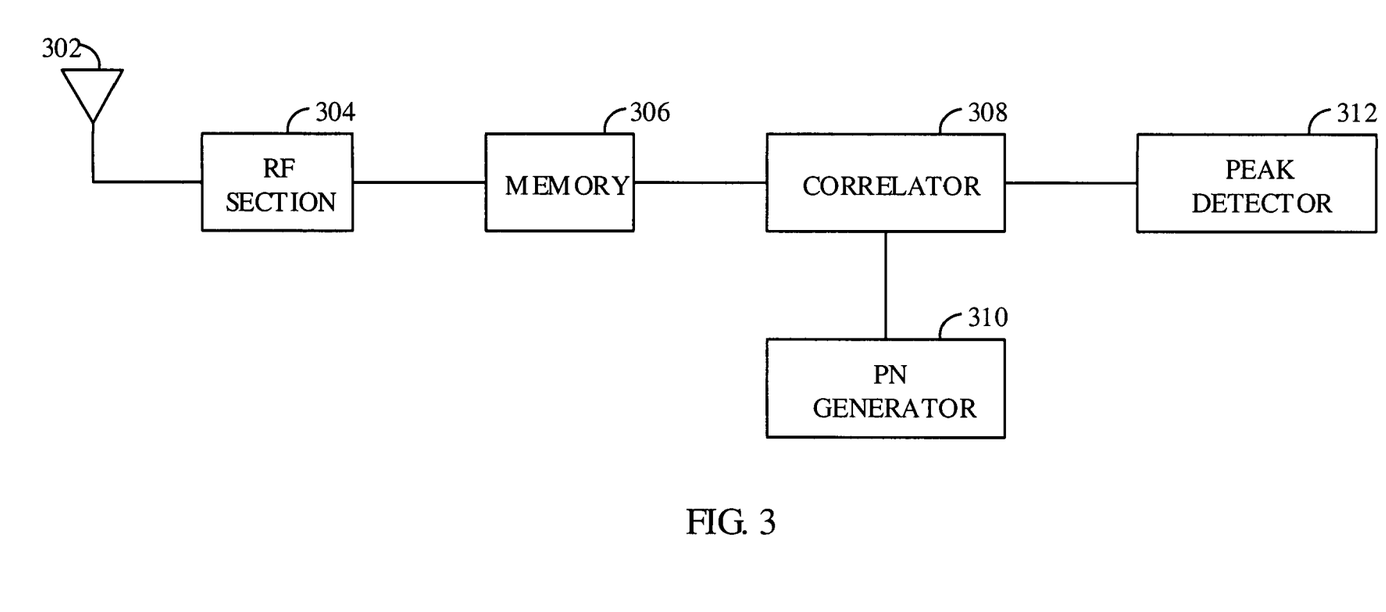
FIG. 3 is a functional block diagram of an exemplary receiver in a subscriber station operating in an HDR communications system.

FIG. 3 is a functional block diagram of an exemplary receiver in a subscriber station operating in the exemplary HDR communications system. In the described exemplary embodiment, the receiver is based on a heterodyne complex (I-Q) architecture. For ease of explanation, the described exemplary receiver is depicted functionally without reference to separate I (in-phase) and Q (quadrature) channels. Referring to FIG. 3, the transmitted signals from all the base stations are received through one or more antennas 302. The resulting superimposed signal received by the antenna 302 is provided to an RF section 304. The RF section can be implemented in any manner known in the art. The RF section 304 amplifies, filters and down converts the superimposed signal to a baseband signal. The baseband signal is then sampled and stored in memory 306. The memory 306 should be sufficiently sized to store enough samples to cover at least one half-slot. This approach should result in at least one gated pilot signal being captured in memory 306. As will be described in greater detail below, one or more half-slots worth of samples can be stored in memory 306 to increase noise immunity.

The correlation process involves sequentially shifting the samples stored in memory 306 through a correlator 308 as part of a systematic search to find an embedded PN code sequence that matches a locally generated PN code. The correlator 308 performs an element-by-element multiplication of the samples with the locally generated PN code and then sums (integration) the result over a fixed time period to produce a correlation value. The correlation value indicates the degree of similarity between the samples in the correlator and the locally generated PN code. The resultant correlation values produced as the samples are sequentially shifted through the correlator 308 are provided to a peak detector 312. The peak detector 312 can be used to identify the peak correlation value in any manner known in the art. A peak correlation value which exceeds a predetermined threshold generally indicates the presence of a gated pilot signal and will occur if any sample sequence in the correlator 308 matches the locally generated PN code. In the described exemplary HDR communications system, the correlation process should continue until all 512 PN codes are generated locally by a PN code generator 310 and correlated with the samples stored in memory 306. This process may result in several peak correlation values being detected by the peak detector 312. The receiver generally establishes a communications channel with the base station whose gated pilot signal produces the strongest peak correlation value.

The integration function of the correlator can involve coherent or noncoherent combining. Coherent combining means that the phase information is preserved in the integration process. Noncoherent combining, on the other hand, means that phase information is lost in the integration process. These concepts can be represented mathematically for a sequence of complex numbers $X_n+Y_n$ for n=1, 2, 3, ... N.

The coherent sum is given as:

$$\sum_{n=1}^{N} (X_n + jY_n). \qquad (1)$$

The noncoherent sum is given as:

$$\sum_{n=1}^{N} (X_n^2 + Y_n^2). \qquad (2)$$

Coherent combining provides good noise immunity but is sensitive to frequency offsets in the baseband pilot signal. Noncoherent combining is relatively insensitive to frequency offsets but may result in poor performance in noisy environments. In at least one embodiment, a correlation process using a combination of coherent and noncoherent integration is chosen to minimize the impact of frequency offsets in the baseband signal on the receiver's ability to acquire the pilot signal.

Figure 4:
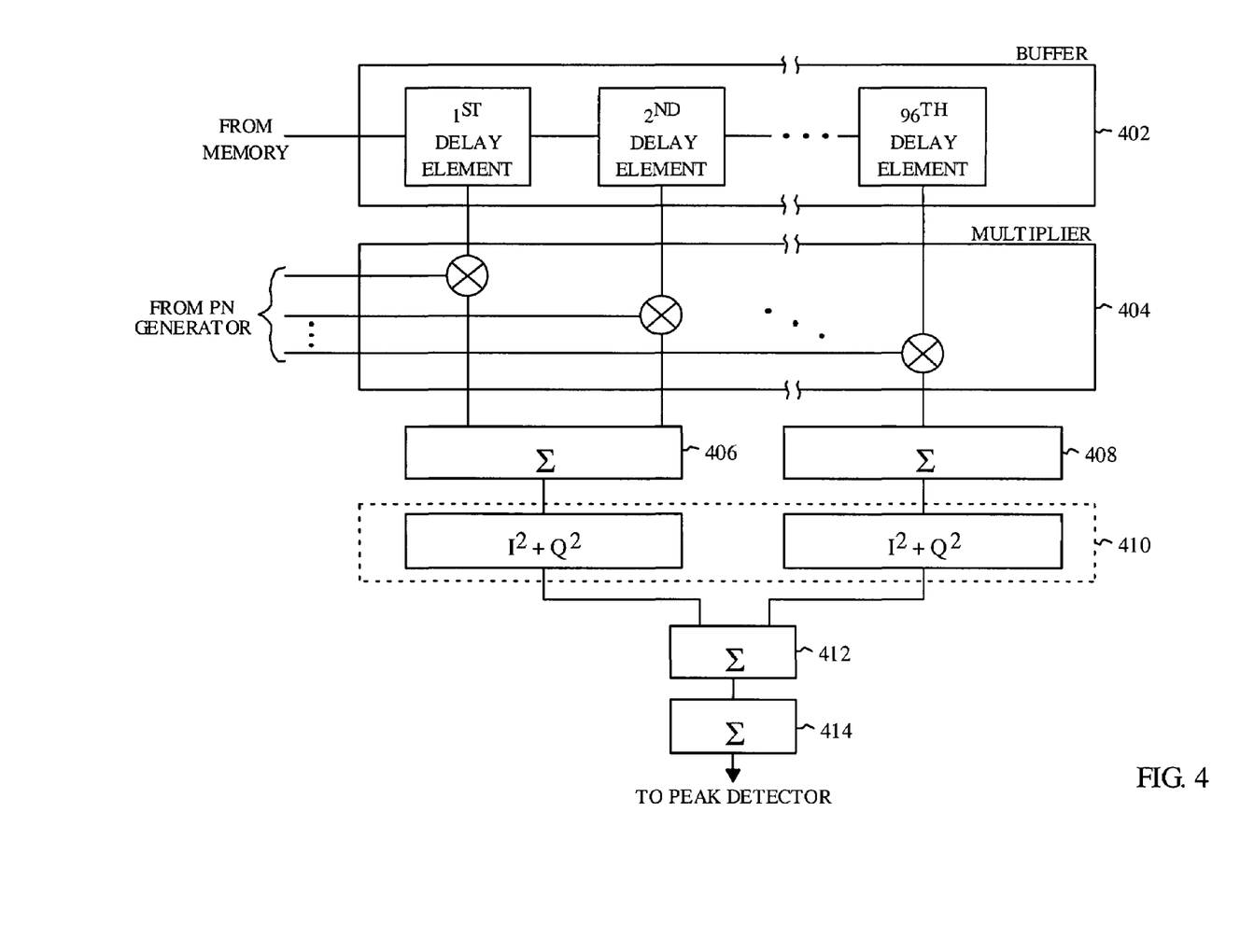
FIG. 4 is a functional block diagram of an exemplary correlator in a subscriber station receiver operating in an HDR communications system.

FIG. 4 is a functional block diagram of an exemplary correlator. The correlator includes a buffer 402 having a fixed depth. Functionally, the buffer 402 can be represented by a tapped delay line with delay elements arranged in series to temporarily store a sample sequence from memory 306 (see FIG. 3) during the correlation process. From an implementation standpoint, the buffer can be a shift register or any other similar device known in the art. The configuration of the buffer 402 may take on various forms depending on such factors as the system application, the operating environment, the overall design constraints, and the performance parameters. By way of example, a buffer operating in an HDR communications system with a 96 chip gated pilot signal can be implemented with 96 delay elements each having a tap as shown in FIG. 4. Alternatively, the buffer can be implemented with 64 delay elements each having a tap to support a 64 chip gated pilot signal. Various other buffer implementations are contemplated to support any gated pilot signal length used by the particular communications system.

The exemplary buffer 402 shown in FIG. 4 supports a correlation process in which the samples are sequentially shifted through the correlator in one-chip increments. As those skilled in the art will readily appreciate, the buffer can be implemented to support other incremental phase delays.

By way of example, samples with delays that are spaced one-half chip apart typically provide good correlation gain without significantly increasing the search time. A buffer supporting this correlation methodology in an HDR communications system with a 96 chip gated pilot signal could be implemented with 192 delay elements with every other delay element having a tap. In this embodiment, the sampling rate of the baseband signal in the RF section can be increased to a one-half chip rate and the size of memory 306 (see FIG. 3) can also be increased to capture 2048 samples. Those skilled in the art will be readily able to assess the performance tradeoffs to determine the optimal phase increment for the samples.

Turning back to FIG. 4, the output of each delay element is provided to a multiplier 404 for an element-by-element multiplication of the samples stored in the buffer 402 with the locally generated PN code to produce 96 product values. Each product value is a complex value with magnitude and phase information. An adder 406 can be used to coherently combine 48 of the complex product values from the multiplier 404. A second adder 408 can be used to coherently combine the remaining 48 complex product values from the multiplier 404. Alternatively, the adders 406 and 408 can be replaced with a single general purpose adder that can be programmed to accumulate any given number of samples and can be time shared to produce any number of coherent sums. As those skilled in the art will appreciate, the 96 complex product values may be coherently combined in other combinations. By way of example, one adder could coherently combine 64 complex product values and the other adder could coherently combine the remaining 32 complex product values. Alternatively, a third adder could be used with each adder coherently combining 32 complex product samples from the multiplier. If the correlator is configured to support a number of product values other than 96, two or more adders may be used to coherently combine various combinations of the complex product values. The manner in which the complex product values are coherently combined is based on a variety of factors such as the system application, the operating environment, the performance parameters, and the overall design constraints.

In the described exemplary embodiment, two coherent sums are produced. The two coherent sums are each complex values with magnitude and phase information. A converter 410 can be used to convert the two complex values into two magnitude values without phase information. In at least one embodiment, the converter 410 can be implemented with a pair of multipliers each which takes the $I^2+Q^2$ product of its respective coherent sum. The two $I^2+Q^2$ products are provided to an adder 412 where they are noncoherently combined to produce a correlation value.

Figure 5:
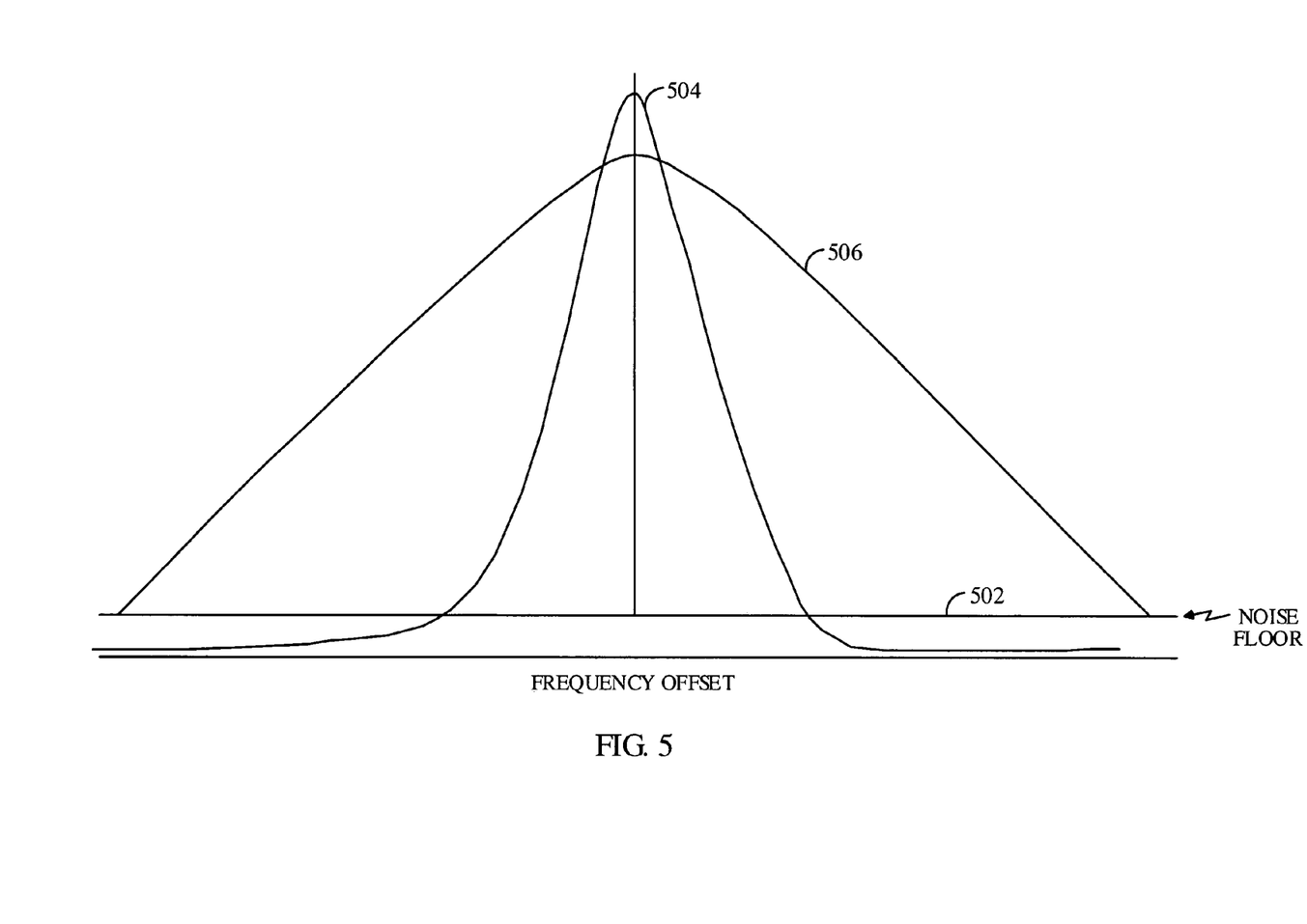
FIG. 5 is a graphical illustration in the frequency domain of two correlation curves representing the outputs of two correlators.

In at least one embodiment of the correlator, the correlation values are continuously provided to the peak detector 312 (see FIG. 3) over a half-slot. Alternatively, the correlator can be configured to perform noncoherent integration over multiple half-slots. By way of example, memory 306 (see FIG. 3) can be sized to capture an entire slot worth of samples. An adder 414 can then be used to noncoherently combine the correlation values for the first half-slot with the correlation values from the second half-slot. With this approach, increased noise immunity may be achieved, but with a greater demand on memory resources. As those skilled in the art will readily appreciate, the number of half-slots that are noncoherently combined are design and application dependent and will vary depending upon the operating environment and the processing resources. FIG. 5 is a graphical illustration in the frequency domain of two correlation curves for the exemplary HDR communications system. The correlation curves represent the probability of detection of the gated pilot signal by the subscriber station with respect to a noise floor 502 as a function of frequency. The visibility of the gated pilot signal increases as the magnitude of the respective correlation curve increases with respect to the noise floor 502. The first correlation curve 504 represents the output of a correlator employing a 96 chip coherent integration process. This correlation curve 504 shows high visibility of gated pilot signals at low frequency offsets, but degrades rapidly as the frequency offset increases. A correlator using a combination of coherent and noncoherent integration generally produces a flatter correlation curve 506. This correlator has good visibility of the gated pilot signal over a much larger frequency offset spectrum. Those skilled in the art will be readily able to access the performance tradeoffs to determine the appropriate correlation curve for any particular application. By applying the inventive concepts disclosed throughout, the skilled artisan will be readily able to ascertain the appropriate combination of coherent and noncoherent integration to achieve the desired correlation curve empirically or by way of analysis.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of correlation, comprising:
receiving a sequence of pilot samples comprising a gated pilot signal;
multiplying the received sequence of pilot samples with a locally-generated code to produce first and second sets of product values, the second set comprising product values of pilot samples that are subsequent in time to pilot samples of the first set;
coherently combining the first set of product values to produce a first coherent sum and noncoherently combining the first coherent sum to produce a first value;
coherently combining the second set of product values to produce a second coherent sum and noncoherently combining the second coherent sum to produce a second value;
noncoherently combining the first and second values to produce correlation values; and
noncoherently combining the correlation values to improve probability of detection of the gated pilot signal.

2. The method of claim 1 wherein multiplying the received sequence of pilot samples comprises despreading the received sequence of pilot samples with the locally-generated code.

3. The method of claim 2 wherein the pilot samples and generated code each comprises a plurality of chips.

4. The method of claim 3 wherein the pilot samples and generated code each comprises 96 chips.

5. The method of claim 1 wherein the pilot samples comprises a pilot signal spread by a code, and wherein multiplying the pilot samples comprises despreading them with the generated code, the generated code comprising a replica of the code.

6. The method of claim 5 wherein the code comprises a pseudo-random noise code.

7. The method of claim 1 wherein the gated pilot signal is spread by a code, and wherein the multiplication of the pilot signal comprises despreading with the generated signal, the generated signal comprising a replica of the code.

8. The method of claim 7 wherein the code comprises a pseudo-random noise code.

9. The method of claim 8 wherein the length of the pseudo-random noise code is 96 chips.

10. The method of claim 9 wherein multiplying the received sequence of pilot samples with the generated signal produces 96 product values.

11. The method of claim 10 wherein the coherent combining of the first and second sets of product values comprises coherently combining 48 of the product values produced from the pilot samples and coherently combining the remaining 48 of the product values produced from the pilot samples.

12. A correlator, comprising:
a buffer configured to receive a sequence of pilot samples, wherein the sequence of pilot samples comprise a gated pilot signal;
a multiplier configured with the buffer to multiply the received sequence of pilot samples with a locally-generated code to produce first and second sets of product values, the second set comprising product values of pilot samples that are subsequent in time to pilot samples of the first set;
a first adder configured with the multiplier to coherently combine the first set of product values to produce a first coherent sum and coherently combine the second set of product values to produce a second coherent sum;
a second adder configured to noncoherently combine the first coherent sum to produce a first value and to noncoherently combine the second coherent sum to produce a second value;
a third adder configured to noncoherently combine the first and second values to produce correlation values; and
a fourth adder configured to noncoherently combine the correlation values to improve probability of detection of the gated pilot signal.

13. The correlator of claim 12 wherein the buffer comprises a shift register.

14. The correlator of claim 12 wherein the buffer comprises a plurality of delay elements configured to sequentially receive the sequence of pilot samples, at least a portion of the delay elements each providing one chip to the multiplier.

15. The correlator of claim 14 wherein the multiplier comprises a plurality of multipliers each configured to receive one of the chips from the buffer.

16. The correlator of claim 15 wherein the generated code comprises a plurality of chips, and each multiplier being further configured to receive one of the chips of the generated code.

17. The correlator of claim 16 wherein the multiplier comprises 96 multipliers each producing one of the product values.

18. The correlator of claim 17 wherein the first adder is further configured to coherently combine the product values from 48 of the multipliers and coherently combine the product values from the remaining 48 of the multipliers.

19. The correlator of claim 12 wherein the coherently combined product values from the first adder each comprises a complex value, the correlator further comprising a converter configured to convert each of the complex values into a magnitude value before being provided to the second adder.

20. A correlator, comprising:
means for receiving a sequence of pilot samples comprising a gated pilot signal;
means for multiplying the received sequence of pilot samples with a locally-generated code to produce first and second sets of product values, the second set comprising product values of pilot samples that are subsequent in time to pilot samples of the first set;
means for coherently combining the first set of the product values to produce a first coherent sum and coherently combining the second set of the product values to produce a second coherent sum;
means for noncoherently combining the first coherent sum to produce a first value and noncoherently combining the second coherent sum to produce a second value;
means for noncoherently combining the first and second values to produce correlation values; and
means for noncoherently combining the correlation values to improve the probability of detection of the gated pilot signal.

21. The correlator of claim 20 wherein the means for producing the product values comprises means for despreading each of the first and second signals with the generated code.

22. The correlator of claim 20 wherein the means for producing the product values is configured to produce 96 product values from the sequence of pilot samples.

23. The correlator of claim 22 wherein the means for coherent summation is configured to combine 48 of the product values produced from pilot samples and combine the remaining 48 of the product values produced from the pilot samples.

24. The correlator of claim 20 wherein the first and second coherent sums each comprises a complex value, the correlator further comprising means for converting each of the complex values into a magnitude value before noncoherently combining them.

25. Computer-readable media embodying a program of instructions executable by a computer program to perform a method of correlation, the method comprising:
receiving a sequence of pilot samples comprising a gated pilot signal;
multiplying the received sequence of pilot samples with a locally-generated code to produce first and second sets of product values, the second set comprising product values of pilot samples that are subsequent in time to pilot samples of the first set;
coherently combining the first set of product values to produce a first coherent sum and noncoherently combining the first coherent sum to produce a first value;
coherently combining the second set of product values to produce a second coherent sum and noncoherently combining the second coherent sum to produce a second value;
noncoherently combining the first and second values to produce correlation values; and
noncoherently combining the correlation values to improve probability of detection of the gated pilot signal.

26. The computer-readable media of claim 25 wherein multiplying the received sequence of pilot samples comprises despreading the received sequence of pilot samples with the locally-generated code.

27. The computer-readable media of claim 26 wherein the pilot samples and generated code each comprises a plurality of chips.

28. The computer-readable media of claim 27 wherein the pilot samples and generated code each comprises 96 chips.

29. The computer-readable media of claim 25 wherein the pilot samples comprises a pilot signal spread by a code, and wherein multiplying the pilot samples comprises despreading them with the generated code, the generated code comprising a replica of the code.

30. The computer-readable media of claim 29 wherein the code comprises a pseudo-random noise code.

31. The computer-readable media of claim 25 wherein the gated pilot signal is spread by a code, and wherein the multiplication of the pilot signal comprises despreading with the generated signal, the generated signal comprising a replica of the code.

32. The computer-readable media of claim 31 wherein the code comprises a pseudo-random noise code.

33. The computer-readable media of claim 32 wherein the length of the pseudo-random noise code is 96 chips.

34. The computer-readable media of claim 33 wherein multiplying the received sequence of pilot samples with the generated signal produces 96 product values.

35. The computer-readable media of claim 34 wherein the coherent combining of the first and second sets of product values comprises coherently combining 48 of the product values produced from the pilot samples and coherently combining the remaining 48 of the product values produced from the pilot samples.

36. A method of acquiring a gated pilot signal, comprising:
transmitting first and second pilot signals separated in time from a remote source;
receiving the first and second signals;
producing a plurality of product values from each of the pilot signals and a generated signal;
coherently combining portions of the product values produced from the first pilot signal and noncoherently combining those coherently combined portions to produce a first value;
coherently combining portions of the product values produced from the second pilot signal and noncoherently combining those coherently combined portions to produce a second value;
noncoherently combining the first and second values to produce correlation values; and
noncoherently combining the correlation values to improve probability of detection of the gated pilot signal.

37. The method of claim 36 wherein the production of the product values comprises multiplying the each of the received pilot signals with the generated signal.

38. The method of claim 37 wherein the transmission of the pilot signals comprises transmitting each of the pilot signals spread by a code, and the multiplication of each of the received pilot signals with the generated signal comprises despreading each of the pilot signals with the generated signal, the generated signal comprising a replica of the code.

39. The method of claim 37 wherein the transmission of the pilot signals comprises transmitting each of the pilot signals spread by a code having a 96 chip length.

40. The method of claim 39 wherein the code comprises a pseudo-random noise code.

41. The method of claim 37 wherein the transmission of the pilot signals comprises transmitting each of the pilot signals spread by a code, and wherein the multiplication of the pilot signals comprises despreading each of the pilot signals with the generated signal, the generated signal comprising a replica of the code.

42. The method of claim 41 wherein the transmission of the pilot signals comprises transmitting each of the pilot signals spread by a code having a 96 chip length.

43. The method of claim 42 wherein the code comprises a pseudo-random noise code.

44. The method of claim 42 wherein the multiplication of the first pilot signal with the generated signal produces 96 product values and the multiplication of the second pilot signal with the generated signal produces 96 product values.

45. The method of claim 44 wherein the coherent combining of the portions of the product values comprises coherently combining 48 of the product values produced from the first pilot signal and coherently combining the remaining 48 of the product values produced from the first pilot signal.

46. A communications system for acquisition of a gated pilot signal, comprising:
a transmitter configured to transmit first and second pilot signals separated in time; and
a receiver configured to receive the pilot signals, the receiver comprising,
a multiplier configured to produce a plurality of product values from each of the first and second pilot signals and a generated signal;
a first adder configured with the multiplier to coherently combine portions of the product values produced from the first signal and coherently combine portions of the product values produced from the second signal;

a second adder configured to noncoherently combine the coherently combined portions of the product values produced from the first signal to produce a first value and to noncoherently combine the coherently combined portions of the product values produced from the second signal to produce a second value;

a third adder configured to noncoherently combine the first and second values to produce correlation values; and a fourth adder configured to noncoherently combine the correlation values to improve probability of detection of the gated pilot signal.

47. The communications system of claim 46 wherein the receiver further comprises a buffer configured to provide the received pilot signals to the multiplier.

48. The communications system of claim 47 wherein the buffer comprises a shift register.

49. The communications system of claim 47 wherein the buffer comprises a plurality of delay elements configured to sequentially receive the first and second signals, at least a portion of the delay elements each providing one chip to the multiplier.

50. The communications system of claim 49 wherein the multiplier comprises a plurality of multipliers each configured to receive one of the chips from the buffer.

51. The communications system of claim 50 wherein the generated signal comprises a plurality of chips, and each multiplier is further configured to receive one of the chips of the generated signal.

52. The communications system of claim 51 wherein the multiplier comprises 96 multipliers each producing one of the product values.

53. The communications system of claim 52 wherein the first adder is further configured to coherently combine the product values from 48 multipliers and coherently combine the product values from the remaining 48 multipliers.

54. The communications system of claim 46 wherein the coherently combined product values from the first adder each comprises a complex value, the correlator further comprising a converter configured to convert each of the complex values into a magnitude value before being provided to the second adder.

* * * * *